April 11, 1961  E. J. C. FOWELL  2,979,623
VELOCITY INDICATOR
Filed June 26, 1959  3 Sheets-Sheet 2

FIG. 3.

INVENTOR.
EDWARD JOSEPH CHALKER FOWELL
BY Larson and Taylor
ATTORNEYS

United States Patent Office 2,979,623
Patented Apr. 11, 1961

2,979,623
VELOCITY INDICATOR

Edward J. C. Fowell, Manchester, England, assignor to National Research Development Corporation, London, England, a corporation of Great Britain Filed June 26, 1959, Ser. No. 823,149

Claims priority, application Great Britain June 26, 1958

5 Claims. (Cl. 250—220)

This invention relates to electronic means for indicating instantaneously the velocity and direction of the motion of one body relative to another.

The invention is particularly, though not exclusively, applicable to automatic control systems for machine tools and the like where the information of required and actual movements of the machine part to be controlled is in digital form.

Where the movement of the machine part is obtained by a simple servo mechanism loop it often happens that the phase lag through the components of the loop is such that "hunting" or oscillation of the machine part will occur. Various methods exist for reducing or eliminating this undesirable movement such as increasing the mechanical damping of one or more of the components or modifying or adding a component. These remedies however are not always entirely satisfactory, especially under conditions of intense vibration.

In such systems, stability can be improved if a velocity signal from the controlled member is fed into the digital controller so that when the member moves due to a control signal the velocity signal will reduce the control signal, and may even reverse the control signal, before the controlled member reaches the desired position whereby the member is decelerated before it reaches its desired position.

If the member is moving only very slowly or is stationary then resistance to unwanted movement is obtained partly from inertia and friction and partly from the corrective action of the servo loop. In many cases the latter may preponderate. If, under these conditions, the member is pushed, as for instance, by the cutting tool, no resistance will arise from the servo system until a signal is obtained from the movement monitoring equipment of the table. The uncontrolled movement will be of the same order as the dimension represented by a digital unit of the movement monitoring means. For the most efficient control it is desirable to inject into the digital controller an instantaneous velocity and direction signal in such a sense as to oppose the unwanted movement of the member.

Methods at present in use for obtaining velocity information with direction indication, suffer from various defects. In one method where a rotary generator is used, for instance, any elasticity or backlash in the drive to the generator will cause distortion of the output signal. Furthermore if the generator is of the D.C. type its life is restricted due to commutator and brush wear; alternatively where the rotary generator is of the A.C. type, the method is restricted in practice to use in A.C. carrier type servo systems. In a further method of velocity indication, pulses are obtained from a diffraction grating system on the machine, the number of pulses occurring in a given time or the time taken to collect a given number of pulses, being evaluated by an electronic pulse rate meter. This method suffers from the disadvantage that there is a time lapse in the system when the counting is taking place and, also, any small movements within the discrete intervals of indication do not give rise to any reading at all.

According to the invention there is provided electronic apparatus for indicating the velocity and direction of motion of a body relative to another body comprising a signal generator actuated by relative motion of the said bodies to generate a first signal and a second signal each of sine wave form and in substantially quadrature phase relationship with one another and a differentiator, means for feeding the said first signal to the differentiator, means for combining the output of the differentiator with the said second signal in a manner such as to produce a resultant signal having an instantaneous amplitude equal to that of the differentiated first signal and having an instantaneous polarity corresponding to the polarity of the product of the differentiated first signal and the second signal whereby the amplitude of the said resultant signal is a measure of the velocity and the polarity of the said resultant signal is an indication of the direction of the said relative motion.

Preferably the second signal is passed to a second differentiator, the output of which is combined with the first signal so as to produce a resultant signal having an instantaneous amplitude equal to that of the differentiated second signal and an instantaneous polarity corresponding to that of the product of the differentiated second signal and the first signal. The two resultant signals are combined to give an output signal indicating the instantaneous velocity and direction of movement of the moving member having a low ripple component.

According to the invention, therefore, there is further provided apparatus for indicating the velocity and direction of motion of a body relative to another body comprising a signal generator, actuated by relative motion between the said bodies to generate a first and a second signal each of sine wave form and in substantially quadrature phase relationship, a first differentiator and a second differentiator, means for feeding the said first signal to the first differentiator, means for combining the output of the first differentiator with the second signal to produce a first resultant signal having an instantaneous amplitude proportional to that of the differentiated first signal and an instantaneous polarity corresponding to that of the product of the differentiated first signal and the second signal, means for feeding the said second signal to the second differentiator, means for combining the output of the second differentiator with the first signal to produce a second resultant signal having an instantaneous amplitude proportional to that of the differentiated second signal and an instantaneous polarity corresponding to that of the product of the differentiated second signal and the first signal, means for combining the two resultant signals to give an output signal the instantaneous amplitude of which output signal is a measure of the velocity and the instantaneous polarity which output signal is an indication of the direction of the said relative motion between the said bodies.

According to the invention there is still further provided apparatus for indicating the velocity and direction of motion of a body relative to another body comprising a signal generator, actuated by relative motion between the said two bodies to generate a first and a second signal each of sine wave form and in substantially quadrature phase relationship, a first differentiator and a second differentiator, means for feeding the said first signal to the first differentiator, a first multiplier, means for combining the output from the first differentiator with the second signal in the first multiplier to produce a first resultant signal having an instantaneous amplitude proporinstantaneous polarity corresponding to that of the product of the differentiated first signal and the second signal, means for feeding the said second signal to the second differentiator, a second multiplier, means for combining the output from the second differentiator with the first signal in the multiplier to produce a second resultant signal having an instantaneous amplitude proportional to that of the differentiated second signal and an instantaneous polarity corresponding to that of the product of the differentiated second signal and the first signal, means for combining the two resultant signals to give an output signal, the instantaneous amplitude of said output signal being a measure of the velocity of the said relative motion between the said two bodies, and the instantaneous polarity of said output signal being an indication of the direction of the said relative motion between the said two bodies, the said output signal having a low-ripple component.

The invention will be more readily understood from the following description of an embodiment of the invention illustrated in the accompanying drawings in which:

Figure 3 is a more detailed drawing of the circuit of Figure 2.

In certain systems for the automatic control of a machine tool the monitoring of relative movement between certain parts such as a slide, the movement of which is to be automatically controlled, and its slideway, is effected by means of two optical diffraction gratings. The first one may be fixed to the controlled member and will extend the length of the maximum movement of this member. The second grating may be fixed to the machine bed and will be quite short. The second grating is set with its rulings at a slight angle to the rulings of the first grating and in such a relative position that a light beam from a convenient source passes through both gratings, moiré interference fringes or bands being produced. When the controlled member and thus the first grating is moved, then the moiré fringes will move bodily in the direction of the rulings of the gratings. Two slits are arranged adjacent to the gratings so that the light passing through the gratings passes through the slits and impinges on two signal generators, for example photoelectric cells. The light value of the beam passing through the slits when movement takes place between the gratings will be of a substantially sinusoidal wave form, the outputs from the signal generators being of the same form. The two slits are so positioned that the output signals of the two signal generators are in quadrature phase relationship.

These two output signals are conveniently called $A$ and $B$ in the figures and description.

The two signals can be used to give an exact instantaneous indication of velocity and direction in a manner which can be explained mathematically as follows:

If $a$ and $b$ are amplitude constants, and $A$ and $B$ are the instantaneous signal values, $x$ = distance moved by controlled member,
$\lambda$ = grating line separation $\div 2\pi$ then $$A = a \sin \frac{x}{\lambda} \text{ and } B = b \cos \frac{x}{\lambda}$$

and $$\frac{dA}{dx} = \frac{a}{\lambda} \cos x \text{ and } \frac{dB}{dx} = -\frac{b}{\lambda} \sin \frac{x}{\lambda}$$

if $$\frac{dx}{dt}$$

is taken as the controlled member velocity $V$ then $$\frac{dA}{dt} = \frac{dA}{dx} \cdot \frac{dx}{dt} = \frac{a}{\lambda} V \cos \frac{x}{\lambda}$$

and $$\frac{dB}{dt} = \frac{dB}{dx} \cdot \frac{dx}{dt} = -\frac{b}{\lambda} V \sin \frac{x}{\lambda}$$

then $$A \cdot \frac{dB}{dt} - B \frac{dA}{dt} = \frac{a.b.V}{\lambda} \cos^2 \frac{x}{\lambda} + \frac{a.b.V}{\lambda} \sin^2 \frac{x}{\lambda}$$

$$= \frac{a.b.V}{\lambda} \left( \cos^2 \frac{x}{\lambda} + \sin^2 \frac{x}{\lambda} \right)$$

Thus $$A \frac{dB}{dt} - B \frac{dA}{dt} = \frac{a.b.V}{\lambda}$$

$$= \frac{a.b.}{\lambda} \times \text{ velocity of the controlled member}$$

Thus $$V = \text{constant} \times \left[ B \cdot \frac{dA}{dt} - A \cdot \frac{dB}{dt} \right] \quad (1)$$

Figure 1:
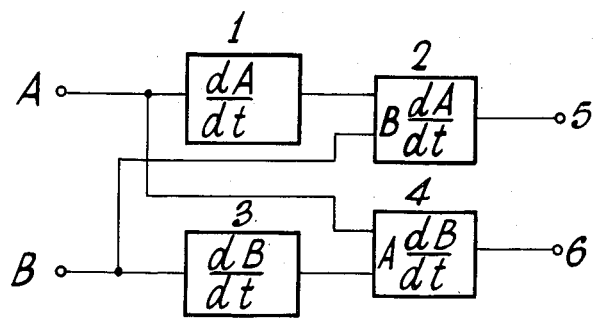
Figure 1 is an ideal circuit giving an exact indication of velocity and direction.

A schematic circuit for carrying out this function is shown in Figure 1, the signals A and B being differentiated in differentiators 1 and 3 respectively, the output from the differentiator 1 being multiplied by the signal B in multiplier 2, the output from differentiator 3 being similarly multiplied by signal A in multiplier 4.

The voltage difference between outputs of the multipliers 2 and 4 at terminals 5 and 6, is an exact indication of the instantaneous velocity and direction of movement of the controlled member.

However, this circuit requires multipliers of the four-quadrant type which are somewhat complicated. Where a less exact velocity indication can be accepted a useful indication can be obtained by processing the signals by the method illustrated schematically in Figure 2. This gives an indication of velocity and direction according to the function $$V \text{ approx.} = \text{constant} \times \left[ \frac{dA}{dt} \cdot \text{sign } (B) - \frac{dB}{dt} \cdot \text{sign } (A) \right]$$

(2)

where $(A)$ and $(B)$ may be $+1$, $-1$ or $0$ where $A$ and $B$ may have a positive value, a negative value or zero value respectively.

The justification of this approximation can be shown mathematically as follows:

With $$\frac{dA}{dt} = \frac{a}{\lambda} \cdot V \cdot \cos \frac{x}{\lambda}$$

as indicated above, if $V$ is taken to be constant over the duration of one half cycle of the input signal then the mean value of $$\frac{dA}{dt}$$

over the half cycle is $$\frac{2}{\pi} \frac{a}{\lambda} V$$

Similarly the mean value of $$\frac{dB}{dt} \text{ is } -\frac{2}{\pi} \frac{b}{\lambda} \cdot V$$

If the two input signals are adjusted so that $a=b$ then $$\frac{dB}{dt}$$

has a mean value of $$-\frac{2}{\pi}\cdot\frac{a}{\lambda}\cdot V$$

The "sign" terms in Equation 2 ensure that successive half cycle mean values have the same polarity for one particular phase relationship of the two input signals A and B.

If $$-\frac{2}{\pi}\cdot\frac{a}{\lambda}\cdot V$$

is subtracted from $$\frac{2}{\pi}\cdot\frac{a}{\lambda}\cdot V$$

the resultant signal has a mean value of $$\frac{4}{\pi}\cdot\frac{a}{\lambda}\cdot V$$

and this mean value is therefore proportional to V.

Figure 2:
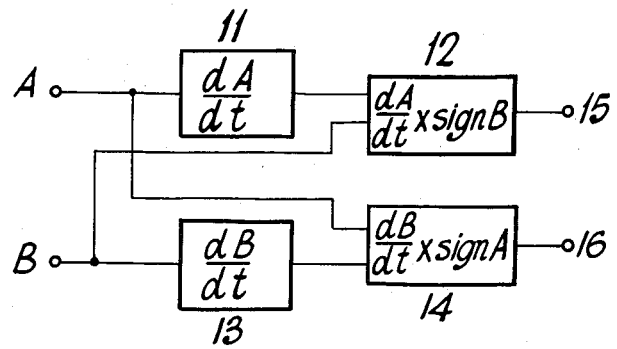
Figure 2 is a circuit giving a substantially correct velocity indication and a correct direction indication.

As shown in Figure 2, signal A is first differentiated in differentiator 11 and is then combined at 12 with signal B to give an output of amplitude equal to the differentiated signal A and of polarity corresponding to that of the product of the differentiated signal A and signal B. Signal B is differentiated in differentiator 13 and is then combined at 14 with signal A to give an output of amplitude equal to the differentiated signal B and of polarity corresponding to that of the product of the differentiated signal B and signal A.

The two outputs, at terminals 15 and 16, are combined to give an approximate indication of the velocity and an exact indication of direction.

Detailed circuits corresponding to the schematic representation of Figure 2 are shown in Figure 3. The input signals A and B are obtained as above and are fed to the two input terminals 21, 21a.

Signal A passes from the terminal 21 to the control grid of the pentode amplifying valve 22 via small capacitor 23. The signal developed across the anode resistor 24 is fed back to the control grid via a large blocking capacitor 25 and resistor 26. A resistor 27 connecting the control grid of 22 to the negative battery terminal 28 ensures that the control grid potential of valve 22 is held at the potential of negative battery terminal 28. This circuit is a well known differentiator circuit of the so-called "virtual earth" type.

The action of the circuit is such that the feedback virtually restrains the control grid so that it can make only a very small potential excursion. Also the only current of consequence flowing in the input circuit will enter the amplifier stage via capacitor 23 and then travel through resistor 26 and blocking capacitor 25 to the anode of the pentode valve 22. The input voltage will then be developed almost entirely across capacitor 23 and the output voltage almost entirely across resistor 26 since the capacity of blocking capacitor 25 is large.

As the signal current through the capacitor 23 is proportional to the first derivative of the capacitor voltage (with respect to time) then the output voltage at the anode of valve 22 will be the differentiated form of the input signal A.

The differentiated signal is then passed through blocking capacitor 29 to the control grid of a power amplifier triode valve 30, the output signal from which passes to a transformer the primary winding 31 of which is connected as the anode load of valve 30. Secondary windings 37 and 38 of the said transformer are connected to a demodulator.

The demodulator consists of four semi-conductor diodes 32, 33, 34 and 35 and compares the phasing of the differentiated signal from the transformer 31, 37, 38 with the input signal B, which is obtained from input terminals 21a via a transformer 36. Current is drawn from the secondary winding of transformer 36, so that when the upper terminal is positive it flows into the centre tap of the secondary coil 38, dividing into the coil halves, through the (semi-conducting) diodes 32 and 34 and being combined again at the junction of resistors 41 and 42. When the polarity of the current is reversed, diodes 33 and 35 conduct in a similar manner.

The output current from transformer 36 is made sufficiently large to ensure that each of the diode pairs is held in conduction during the relevant half cycle irrespective of the polarity of the differentiated signal currents from amplifier valve 30 impressed on the diodes via transformer 31, 37, 38. This results in the secondary windings 37, 38 of the transformer 31 being coupled to the output terminals 39 and 40 alternately for each half cycle of the input wave form at terminals 21a.

The windings 37 and 38 of the transformer 31, 37, 38 are wound in opposite senses so that the differentiated signal appearing at the anode of valve 30 is reversed once every half cycle of the input signal B applied to terminals 21a on its passage to the output terminals 39, 40 and the demodulator output is therefore unidirectional in nature for a given phase relationship between the input quadrature signals, i.e. while the movable member is moving in the same direction. If the movable member reverses its direction then the input signals in quadrature from the gratings are reversed in phase relationship and the phase relationship between the demodulator inputs is thus also reversed giving an output signal of the other polarity.

The signal B at input terminals 21a is treated in a similar manner, the equivalent items in its section of the circuit in Figure 3 being given the same numbers as above with the addition of suffix "a." The demodulator for this section of the circuit is supplied with an input from signal A via a transformer 36a.

The two signals occurring at the output terminals 39, 40 and 39a, 40a are added together by connecting the outputs of the two demodulators together in series so as to give the required velocity indication. The amplitude of the indication will approximately represent the velocity and the polarity will accurately represent the direction of motion of the movable member.

The circuit as shown in Figure 3 is suitable for working with input frequencies of the approximate range of 50 to 5,000 cycles per second, which corresponds to a velocity variation of 100:1. The low frequency performance can be extended by replacing the transformers by other items in a known manner, without affecting the principle of the invention.

Figure 4:
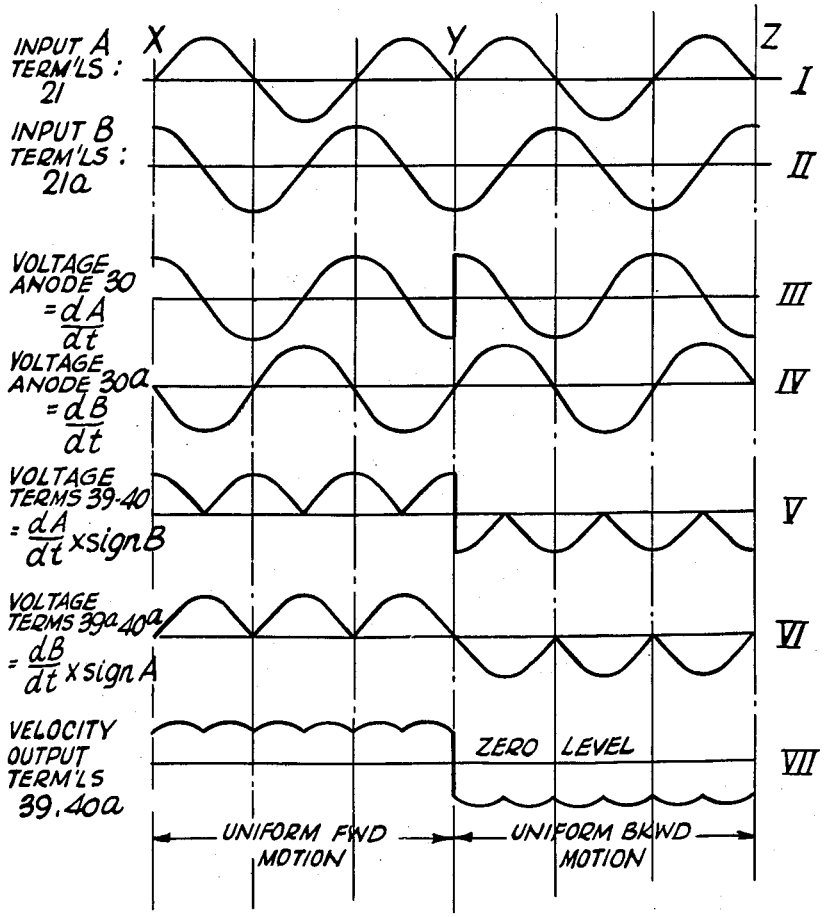
Figure 4 is a series of diagrams showing the wave forms at various points in the circuit in Figure 3.

In Figure 4 the two upper Diagrams I and II show typical input signals A and B obtained when the moving member moves at a uniform velocity in one direction ($x$ to $y$), reverses at $y$ and thereafter moves at a uniform velocity in the reverse direction ($y$ to $z$). Diagrams III and IV are the differentiated signals appearing at anodes 30 and 30a. Diagrams V and VI are the wave forms of the outputs at terminals 39, 40 and 39a, 40a, being the resultant of multiplying the signals of the Diagrams III and IV by the sign of the Diagrams II and I respectively. Diagram VII is the resultant velocity and direction signal between terminals 39a and 40 obtained by adding Diagrams V and VI.

In further explanation of Figure 4, it should be noted that the reversal of direction occurring at the point Y happens to take place at a time when the A signal is at zero amplitude, that is to say when the moiré fringe pattern produced by a movement monitoring arrangement of the diffraction grating type previously described is midway between the darkest zone of a fringe and the lightest region between two adjacent dark zones. If movement had continued in the same direction as previously it would have brought the lightest zone of the fringe pattern before the optical system whereas, due to the change of direction movement subsequent to Y brings the dark zone again before the optical system. In the case of signal A however the change of direction happens to take place at an instant where the lightest zone of the fringe pattern is before the optical system so that further movement, in whichever direction, would be followed by a movement towards a dark zone of the fringe pattern. For this reason curve II of Figure 4 does not record the change of direction. If the change of direction had happened say one-eighth of a cycle earlier or later both curves I and II would have recorded the change of direction. The same applies to curves I, III and V and II, IV and VI respectively.

The velocity of the monitored motion is reflected in the frequencies of the A and B signals and as the slopes of the corresponding curves I and II around the zero amplitude regions varies as the frequency of the A and B signals, so the amplitude of the differentiated signals shown respectively in curves III and IV varies as the frequency of the A and B signals respectively and is therefore proportional to the said velocity of motion. Similar variations of amplitude occur in the succeeding curves V, VI and VII and in the case of the latter curve the vertical co-ordinates of the rippled parts of the curve (i.e. the amplitude) vary according to the velocity of the said motion and the polarity of these parts of the curve represents the direction of the said motion.

I claim:

1. Apparatus for indicating the velocity and direction of motion of a body relative to another body comprising a signal generator actuated by relative motion of the said bodies to generate a first signal and a second signal each of sine wave form and in substantially quadrature phase relationship with one another and a differentiator, means for feeding the said first signal to the differentiator, means for combining the output of the differentiator with the said second signal in a manner such as to produce a resultant signal having an instantaneous amplitude equal to that of the differentiated first signal and having an instantaneous polarity corresponding to the polarity of the product of the differentiated first signal and the second signal whereby the amplitude of the said resultant signal is a measure of the velocity and the polarity of the said resultant signal is an indication of the direction of the said relative motion.

2. Apparatus for indicating the velocity and direction of motion of a body relative to another body comprising a signal generator, actuated by relative motion between the said bodies to generate a first and a second signal each of sine wave form and in substantially quadrature phase relationship, a first differentiator and a second differentiator, means for feeding the said first signal to the first differentiator, means for combining the output of the first differentiator with the second signal to produce a first resultant signal having an instantaneous amplitude proportional to that of the differentiated first signal and an instantaneous polarity corresponding to that of the product of the differentiated first signal and the second signal, means for feeding the said second signal to the second differentiator, means for combining the output of the second differentiator with the first signal to produce a second resultant signal having an instantaneous amplitude proportional to that of the differentiated second signal and an instantaneous polarity corresponding to that of the product of the differentiated second signal and the first signal, means for combining the two resultant signals to give an output signal the instantaneous amplitude of which output signal is a measure of the velocity and the instantaneous polarity which output signal is an indication of the direction of the said relative motion between the said bodies.

3. Apparatus for indicating the velocity and direction of motion of a body relative to another body comprising a signal generator actuated by relative motion between the said two bodies to generate a first and a second signal each of sine wave form and in substantially quadrature phase relationship, a first differentiator and a second differentiator, means for feeding the said first signal to the first differentiator, a first multiplier, means for combining the output from the first differentiator with the second signal in the first multiplier to produce a first resultant signal having an instantaneous amplitude proportional to that of the differentiated first signal and an instantaneous polarity corresponding to that of the product of the differentiated first signal and the second signal, means for feeding the said second signal to the second differentiator, a second multiplier, means for combining the output from the second differentiator with the first signal in the multiplier to produce a second resultant signal having an instantaneous amplitude proportional to that of the differentiated second signal and an instantaneous polarity corresponding to that of the product of the differentiated second signal and the first signal, means for combining the two resultant signals to give an output signal, the instantaneous amplitude of said output signal being a measure of the velocity of the said relative motion between the said two bodies, and the instantaneous polarity of said ouput signal being an indication of the direction of the said relative motion between the said two bodies, the said output signal having a low-ripple component.

4. Apparatus as claimed in claim 3 in which the said multipliers each comprise a transformer having a primary winding coupled to one of the two differentiators, and two secondary windings, the one connected through rectifiers poled in the same direction to output terminals, the other being connected to the said terminals through rectifiers poled in the same direction as one another but both poled in the opposite direction to that of the two first-mentioned rectifiers, the two said secondary windings being connected to the said terminals in such a sense that a current flowing in the primary winding produces a potential at an end of one of the secondary windings which is of opposite polarity to the potential produced at an end of the other secondary winding, which said ends are connected, through rectifiers as aforesaid to one of the said terminals, and means for applying the first signal to the rectifiers of the second multiplier and for applying the second signal to the rectifiers of the first multiplier to bias such rectifiers so as to connect one of the two secondary windings of each of the transformers to the said terminals according to the polarity of the signal applied to the rectifiers.

5. Apparatus as claimed in claim 1 in which the said signal generator comprises closely ruled gratings, one mounted on one body, the other mounted on the other body, with the rulings of one grating at a small angle relative to the rulings of the other grating so that moiré fringes are produced when a beam of light is passed through both gratings, two optical systems comprising at least one light source which may be common to the two systems and each comprising a photo-electric cell, the light from said light source passing through the said gratings and falling on the sensitive elements of each photo-electric cell, the parts of the moiré fringe pattern presented to the two photo-electric cells being spaced apart along the direction of the rulings of the said gratings by an interval substantially equal to one quarter of the distance between adjacent moiré fringes, relative motion of the bodies causing the movement of said moiré fringes in the direction of the rulings of the said gratings whereby two sine wave output signals are produced by the two photo-electric cells.

References Cited in the file of this patent

UNITED STATES PATENTS

| | | |
|---|---|---|
| 2,857,802 | Cail | Oct. 28, 1958 |
| 2,861,345 | Spencer | Nov. 25, 1958 |
| 2,880,512 | Fenemore et al. | Apr. 8, 1959 |
| 2,886,717 | Williamson et al. | May 12, 1959 |
| 2,886,718 | Shepherd et al. | May 12, 1959 |